Figure 1:
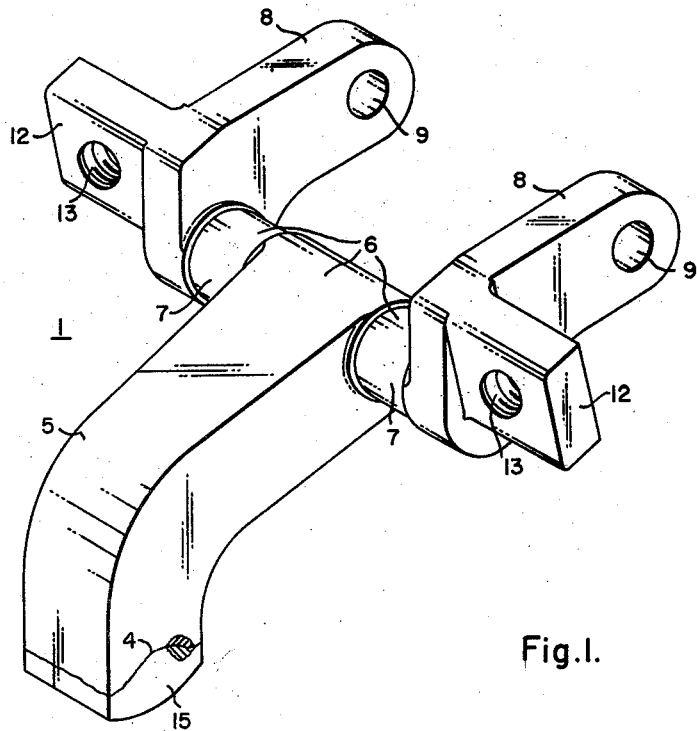

Oct. 13, 1964   J. M. KELLY   3,152,931
CONTACTOR ASSEMBLY
Filed Dec. 7, 1960

WITNESSES

INVENTOR
James M. Kelly
BY
ATTORNEY

United States Patent Office 3,152,931
Patented Oct. 13, 1964

3,152,931
CONTACTOR ASSEMBLY
James M. Kelly, Trafford, Pa., assignor to Westinghouse Electric Corporation, East Pittsburgh, Pa., a corporation of Pennsylvania
Filed Dec. 7, 1960, Ser. No. 74,386
3 Claims. (Cl. 148—11.5)

This invention is directed to electrical contactors and is particularly concerned with contactor assemblies adapted for use in heavy duty electrical service devices, as for example, heavy relays, motor starters, circuit breakers, short circuit switches, and the like.

One of the difficult problems arising in connection with electrical switchgear involves the interruption of electrical circuits under relatively heavy electrical loads. The arcing which occurs when the contacts are separated results in welding, pitting, and in the oxidation and erosion of the contact surfaces. These conditions have, of course, adversely affected the life of contactor assemblies embodying the contacts proper. As a result, a substantial amount of work has been done to develop materials which will resist deterioration under the severe conditions found in heavy duty electrical circuit interrupter applications.

A group of composite metal alloys has been developed for use as the contact components of a contactor, which alloys generally perform satisfactorily under the conditions outlined above. Among these composite contact metal alloys are tungsten-silver, tungsten-copper, molybdenum-silver, and molybdenum-copper. Because of their inherent resistance to welding and sticking during arc interruption, as well as other advantages such as good contact life, and low contact resistance, composite metal contacts are presently used in much of the heavy duty switchgear produced in this country.

Use of composite metal alloys of the type which has been described has brought with it certain problems which have not as yet been entirely satisfactorily overcome. Of quite serious concern are the methods available for attaching the composite metal contact to the supporting and actuating contactor member. Heretofore, a brazing operation with silver as the bonding metal has been employed to accomplish the attachment of the contact to the contactor member.

It should be understood that the service requirements of contactor members are such that reasonably high strength and hardness along with good electrical conductivity are required. It is therefore commonly found that contactor members are made from alloys which are susceptible to precipitation hardening. Precipitation hardenable copper-base alloys containing, as an essential element, chromium, in an amount of from about 0.1% to 2.5%, by weight, which are sold under the trade name "Cupaloy," have found favor with the industry for this application.

Ordinarily contactor assemblies are made in this way: the contactor member is cast, machined to shape, and then is precipitation hardened. Precipitation hardening develops the desired strength and hardness in the contactor member so that it will function properly. The contact of composite metal, which ordinarily has previously been formed by powder metallurgy techniques is then brazed to the contactor member. The brazing operation requires considerable heat in order to melt the silver brazing alloy, and this heat raises the temperature of the contactor member to which the contact is being brazed. It is often found that at least the region adjacent the brazement is annealed, and therefore softened, and it is sometimes found that under certain conditions such brazing can result in complete softening of the contactor member. The softened contactor member has inferior properties. Such a softened contactor member cannot be precipitation hardened again because the quench temperature required would melt the silver brazing alloy joining the contact to the contactor member.

Accordingly, it is the primary object of this invention to provide contactor assemblies comprising a precipitation hardened copper-base alloy support with composite metal contact elements comprising a refractory constituent welded thereto.

It is a further object of this invention to provide a method for making high strength contactor assemblies which involves weld depositing a composite metal contact comprising a refractory metal on a precipitation hardenable copper-base alloy contactor member, and thereafter precipitation hardening the contactor member.

It is another object of this invention to provide composite metal weld rods particularly suitable for depositing a composite metal contact comprising a refractory metal on a precipitation hardenable copper base alloy, and a method for making such weld rods.

Other objects and advantages of this invention will, in part, be obvious and, in part, will appear hereinafter.

Figure 2:
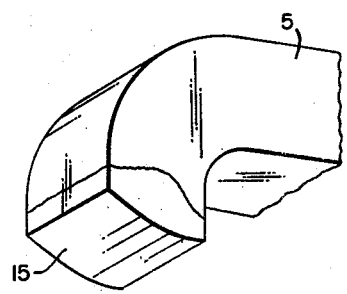

For a better understanding of the nature and objects of the invention, reference should be had to the following detailed description and drawings, in which:

FIGURE 1 is a perspective view of a switchgear assembly having a composite contact weld deposited thereon in accordance with this invention, and FIG. 2 is a fragmentary perspective view of the contact face of the contactor member.

In accordance with this invention, and the attainment of the foregoing objects, a circuit interrupter member has been produced which is composed of a precipitation hardened copper-base alloy, and which has weld deposited thereon a contact member composed of a composite metal including a refractory constituent. More specifically, there is disclosed a contactor assembly comprising a contactor member formed from a precipitation hardened copper-chromium alloy comprising, by weight, from 0.08% to 2.54% chromium with the balance essentially copper, and a composite metal contact weld deposited thereon, the composite metal from which the cotnact is made comprising from 45% to 65%, by weight, of a refractory constituent selected from the group consisting of tungsten, molybdenum, and the carbides thereof, and from 35% to 55%, by weight, of a metallic bonding constituent having a high electrical conductivity selected from the group consisting of silver, copper and copper-chromium alloys.

There is also disclosed, in a contactor assembly, a contact composed of a weld deposited composite metal alloy consisting of, by weight, from 45% to 65% of a refractory constituent selected from the group consisting of tungsten, molybdenum, tungsten carbide, and molybdenum carbide, and from 35% to 55%, by weight, of a bonding metallic constituent having a high electrical conductivity selected from the group consisting of copper, silver, and copper-chromium alloys.

With respect to the proportions of refractory metal and high conductivity bonding metallic constituent of the composite metal, it has been found to be desirable in some cases to restrict the refractory metal to the range of from 55% to 60% by weight, and the bonding constituent to from 40% to 45%, by weight.

A feature of this invention comprises a novel method for making a hardened contactor assembly comprising a contactor member with a composite metal contact metallurgically bonded thereto, the steps comprising, (1) weld depositing a composite metal contact comprising a refractory metal constituent on said contactor member with a composite metal weld rod, (2) solution treating the contactor assembly at a temperature and for a length of time such that the contactor member consists essentially of an alloy in a single solid solution phase, (3) rapidly quenching the contactor assembly, (4) heating the contactor assembly to a relatively lower temperature to cause precipitation of a second solid solution phase whereby the contactor member is strengthened and hardened.

Also, a method for making a composite metal weld rod suitable for weld depositing composite metal contacts is disclosed, the method comprising the steps of, mixing a powdered refractory constituent of fine particle size with a resinous organic binder so that the individual particles are completely covered with the binder and a putty-like mass is formed, shaping the mass to rod form, drying the rod, heating the rod in a non-oxidizing atmosphere to pyrolize and decompose the bulk of the binder to produce a porous refractory mass with a small amount of carbon or carbonaceous matter holding the mass in shape, placing a solid high conductivity constituent in intimate contact with the refractory mass, and heating the constituents thus situated to melt the high conductivity constituent whereby the porous refractory mass is thoroughly impregnated with the high conductivity constituent.

It will be understood for the purposes of this disclosure that when reference is made to a "copper-chromium alloy," an alloy consisting, by weight, of from 0.08% to 2.54% chromium, or more particularly, from 0.4% to 1.2% chromium, and the balance copper with small amounts of additives such as silver or zirconium and incidental impurities, is intended.

Referring now to FIGS. 1 and 2 of the drawings, there is shown one type of contactor assembly produced in accordance with the invention which comprises a crank arm device indicated generally at 1. The crank arm device 1 consists of an L-shaped crank arm 5 which is integral with a shaft 6 having bearing surfaces 7. The arm 5 is secured to the shaft 6 at substantially the center thereof between the bearing surfaces 7 and extends at generally a right angle thereto. At the ends of the shaft 6 and at a right angle thereto are a pair of ears 8 extending in planes substantially parallel to the arm 5. In the ears 8 are the bores 9 aligned with each other, and serving as a bearing for actuating means (not shown) for the crank arm device 1. On the ears 8 and extending at a right angle thereto and substantially parallel to the shaft 6 are a pair of lugs 12 having therein threaded mounting bores 13 for securing current conducting means (not shown) to the crank arm device. At the extreme free end of the crank arm 5, opposite from the ears 8 there is located a contact 15, which in accordance with this invention is a composite metal weld deposit. Heavy electrical currents flow from ears 12 to the shaft 6, then to the crank arm 5 and finally to contact 15. FIGURE 2 shows more clearly the surface shape and geometrical configuration of the weld deposited contact 15.

In the operation of a circuit interrupter embodying the device 1 shown in the figures, an actuating means, for example, a compressed air or spring driven member exerts a rapid and heavy force to move the ear 8 clockwise in a fraction of a second so as to separate contact 15 from a fixed mating contact with which it was engaged to allow current to flow freely therebetween, so that contact 15 separates rapidly from the fixed contact and thereby interrupts flow of electrical current. Such separation may be effected in less than one cycle. This operation imposes heavy loads on the ears 8 and crank arm 5.

*Example*

A contactor assembly similar to the crank arm device shown in FIGURES 1 and 2 was made. The main body of the device consists of a precipitation hardenable copper-chromium alloy comprising from 0.4% to 1.2% chromium, and the balance essentially copper and small amounts of incidental impurities. The contact consists of an arc-deposited composite metal alloy comprising tungsten and the copper-chromium alloy described above. The composite metal contact was welded to the device 1 while the device was in the unhardened condition.

In fabricating the crank arm assembly the composite metal contact is deposited on the face of the free end of crank arm 5 using special weld procedures. In one case a tungsten copper-chromium composite metal weld rod was applied using inert arc welding with argon gas. The weld rod consisted of from 55% to 60%, by weight, of tungsten, and the balance essentially of the copper-chromium alloy.

The precipitation hardening treatment which follows weld deposition of the contact, involves heating the assembly to a temperature of from 900° C. to 1015° C. for a period of about ½ hour to put the alloy in solid solution and subsequently quenching into cold water. After this solution heat treatment, the contactor assembly is precipitation hardened to the desired degree, and, in this case, the treatment consists of heating the contactor assembly to from about 450° C. to 600° C. for from 16 to 20 hours.

Because the tungsten-copper alloy contact is welded to the copper-chromium member before heat treatment, any brazing operation subsequent to heat treatment is eliminated and the contact assembly remains in its fully hardened state with maximum developed physical properties. Further, since the melting point of the composite metal alloy is above the quench temperature required for the precipitation hardening treatment, no damage to the composite contact metal occurs during the quenching operation.

In a manner similar to that described in the above example, copper-cromium alloy contactor members have been made with arc deposited composite metal contacts thereon, in which the high temperature constituent of the composite metal is tungsten, molybdenum, tungsten carbide, or molybdenum carbide, and the impregnating highly conductive metal constituent consists of one of copper, silver, or copper-chromium alloy. Helium gas may be used in the inert arc welding as a substitute for argon gas. While in the solution treatment of the above example it was sufficient to maintain the assembly at temperature for ½ hour, the time required in other instances will depend upon the thickness of the parts treated, with thicker parts requiring a longer time at temperature.

As indicated previously, the fabrication of the welding rods employed to deposit the composite tungsten-copper alloy contact just described required the solution of certain problems. In order to manufacture satisfactory tungsten copper-chromium alloy welding rod for arc deposition of the tungsten-copper alloy composite metal contact, care must be taken with respect to manufacturing procedures, composition, and microstructures.

In making the composite metal welding rods used to deposit the composite metal contacts, powdered tungsten of a fineness such as to pass through a 100 mesh sieve, for example, of a fineness to pass through a 300 mesh sieve, is thoroughly mixed with a liquid resinous organic bonding agent. A suitable resinous organic bonding agent is a mixture of 50% orange shellac and 50% alcohol. Various other resinous binders such as solutions of polystyrene, cellulose acetate, polyethylene, polymethyl methacrylate, phenolic resins, or mixtures of two or more may be employed. A sufficient amount is used to just completely cover the tungsten particles. The resulting putty-like mass can be extended, formed, or molded to desired shape or size. The shaped mass with the resinous bonding agent is then permitted to dry either at room temperature or at an elevated temperature. After drying, the mass is subjected to heating at an elevated temperature in a non-oxidizing atmosphere or vacuum to pyrolize and decompose the bonding agent, most of the agent being evaporated, though small amounts of carbon or carbonaceous material remain behind and hold the member in shape, but leaving a porous tungsten compact. This porous tungsten compact is then placed into a furnace in intimate contact with an impregnating highly conductive metal or alloy and slowly heated to a temperature which is above the melting point of the silver, copper, or copper-chromium alloy or mixtures thereof which is the impregnating or bonding metal. This melting-impregnation step is carried out in an atmosphere of either hydrogen or cracked ammonia to prevent oxidation.

Mixtures of tungsten and molybdenum, and their carbides may be employed. Thus, equal parts of tungsten and molybdenum powder may be treated. Alloys of tungsten and molybdenum with each other may form the refractory powder.

In the composite metal member produced by this process, the tungsten particles present are completely encased and in intimate contact with a film of silver, copper, or copper-chromium alloy. It has been found that this physical structure; i.e., with tungsten particles completely surrounded with impregnating metal or alloy is indispensibly necessary to the successful transfer of the composite alloy across the arc during welding. Poor wetting of the high temperature metal with the impregnating or bonding metal invariably results in poor quality deposits of the composite alloy. The process here disclosed assures good wetting and coverage of the tungsten particles.

The precise composition range of composite alloys of this type will be dependent upon the particular base metal and the lower melting bonding metal or alloy employed. In general, the refractory metal or carbide should amount to from 45% to 65%, by weight, of the total composite alloy, and the impregnating metal should amount to from about 35% to 55%, by weight.

The composite alloys may include certain other high temperature elements such as tantalum and zirconium either separately or alloyed therewith, in combination with other bonding alloys such as the precipitation hardening alloys of the copper-base, silver-base, nickel-base, cobalt-base, and iron-base alloy families. Also, the carbides and nitrides of various high temperature elements, such as tungsten carbide and molybdenum carbide can be deposited in a similar manner. Although a copper-chromium impregnating alloy was employed in the example, a wide variety of impregnating alloys of the precipitation hardening type can be used for specific applications. The basic requirement, if an impregnating alloy rather than an element such as silver is employed, is that alloying must take place before impregnation. In addition, the metal or alloy used must be capable of wetting the refractory element, alloy, or compound which is to be impregnated therewith.

Insofar as electrical characteristics are concerned, contacts made from the composite metals manufactured according to the teachings of this invention have been satisfactory in both short circuit and life tests wherein they withstood numerous opening and closing cycles of the contacts. Mechanically, the composite contact metal of about 45% copper-chromium alloy bonding about 55% of tungsten particles, after weld deposition, attained a satisfactory hardness level of 86 $R_B$ (Rockwell B) upon heat treatment of the contactor assembly, and the metal of the contactor member exhibited a fine grain structure and was structurally sound.

Thus, there has been disclosed a simple and effective method for attaching a composite metal contact to a contactor member by weld deposition, whereby the contactor assembly may thereafter be precipitation hardened without affecting the integrity of the bond between the contact and the contactor member.

It will be understood that the specification and drawings are exemplary only and not in limitation of the invention.

I claim as my invention:

1. In a method for making a contactor assembly having a contactor member comprising a precipitation hardenable copper-base alloy consisting essentially of, by weight, from 0.08% to 2.54% chromium, and the balance copper with small amounts of additives and incidental impurities, and a composite metal contact on said contactor member comprising from 45% to 65%, by weight, of a refractory constituent selected from the group consisting of tungsten, molybdenum, tungsten carbide and molybdenum carbide, and from 35% to 55%, by weight, of a metallic bonding constituent having a high electrical conductivity selected from the group consisting of silver, copper and copper-chromium alloys, the steps comprising, (1) weld depositing the composite metal contact on said contactor member with a composite metal weld rod, (2) solution treating the contactor assembly at a first relatively high temperature for a length of time such that the contactor member consists essentially of the copper-base alloy in a solid solution phase, (3) rapidly quenching the contactor assembly, (4) heating the contactor assembly to a relatively lower second temperature not in excess of 600° C. to cause precipitation of a second solid solution phase thereby hardening the contactor member.

2. In a process for making a contactor assembly comprising a contactor member formed from a copper-chromium alloy consisting of, by weight, from 0.08% to 2.54% chromium, and the balance copper with small amounts of additives and incidental impurities, and a composite metal contact on said contactor member consisting of, by weight, from 45% to 65% tungsten, and from 35% to 55% of said copper-chromium alloy, the steps comprising, (1) weld depositing the composite metal contact on said contactor member with a composite metal weld rod, (2) heating the contactor assembly to a temperature of from 900° C. to 1015° C., (3) quenching the assembly in water, (4) reheating the assembly to a temperature of from about 450° C. to 600° C. for from 16 to 20 hours, whereby the contactor member is precipitation hardened.

3. The process of claim 1 in which the composite metal contact is applied to the contactor member by insert gas arc welding.

References Cited in the file of this patent

UNITED STATES PATENTS

| | | |
|---|---|---|
| 2,046,380 | Hensel | July 7, 1936 |
| 2,142,671 | Hensel | Jan. 3, 1939 |
| 2,189,755 | Hensel | Feb. 13, 1940 |
| 2,193,246 | Chace | Mar. 12, 1940 |
| 2,206,537 | Price | July 2, 1940 |
| 2,249,417 | Chace | July 15, 1941 |
| 2,319,373 | Tormyn | May 18, 1943 |
| 2,386,604 | Goetzel | Oct. 9, 1945 |
| 2,646,613 | Enzler | July 28, 1953 |
| 2,699,597 | Arms | Jan. 18, 1955 |
| 2,853,768 | Boucek | Sept. 30, 1958 |
| 2,865,088 | Yntema | Dec. 23, 1958 |